Patented May 7, 1940

2,200,004

UNITED STATES PATENT OFFICE

2,200,004

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application November 12, 1938, Serial No. 240,114

12 Claims. (Cl. 8—50)

This invention relates to the art of dyeing or coloring.

We have found that aromatic azo compounds having the general formula:

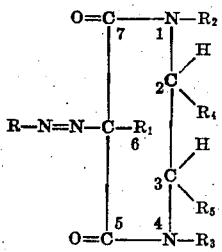

wherein R represents the residue of an aromatic nucleus, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group constitute a valuable new class of dye compounds the members of which may be employed for the dyeing or coloring of organic derivatives of cellulose, silk and wool as more fully set forth hereinafter.

The aromatic azo dye compounds of our invention can be prepared by coupling in an alkaline medium an aromatic diazonium compound with a heterocyclic coupling compound having the formula:

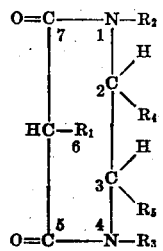

wherein $R_1$, $R_2$, $R_3$, $R_4$, $R_5$ have the meaning previously assigned to them.

The nuclear non-sulfonated aromatic azo compounds of our invention constitute valuable dyes for the coloration of organic derivatives of cellulose such as cellulose acetate silk, for example. For the dyeing of organic derivatives of cellulose, compounds wherein R represents the residue of an aryl nucleus of the benzene series have been found to be generally advantageous. The azo dye compounds of our invention may be generally employed, whether sulfonated or non-sulfonated, for the coloration of silk and wool. From the foregoing, it will be seen that by the use of a nuclear non-sulfonated dye, an organic derivative of cellulose, silk or wool may be dyed or mixtures of any two of these materials may be dyed. Similarly, it will be apparent that mixtures of the above materials may be dyed employing a mixture of sulfonated and nuclear non-sulfonated dyes. The dye compounds of our invention do not dye cotton or viscose and because of this can be used for cross dyeing mixtures of these materials with any or all of the above named materials. While the azo compounds of our invention may be employed to dye textile materials, for example, made of or containing an organic derivative of cellulose, silk or wool, our invention is more particularly directed to the nuclear non-sulfonated compounds and their application for the dyeing or coloring of organic derivatives of cellulose, such as those mentioned hereinafter.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials such as textile materials made of or containing an organic derivative of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose such as those hereinafter. A further object is to produce dyed textile materials made of or containing an organic derivative of cellulose which are of good fastness to light and washing. Other objects will hereinafter appear.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid ester of cellulose, such as cellulose acetate-propionate, cellulose acetate-butyrate, and the cellulose ethers, such as methyl cellulose, ethyl cellulose or benzyl cellulose.

The following examples illustrate the preparation of the dye compounds of our invention:

*Example 1*

12.3 grams of o-anisidine are added to 150 cc. of water to which has been added 25 cc. of 36% hydrochloric acid. The resulting solution is cooled to a temperature approximating 0.5° C. by the addition of ice, for example, and the o-anisidine is diazotized while maintaining this temperature by adding, with stirring, 6.9 grams of sodium nitrite dissolved in water.

12.8 grams of

are dissolved in 200 cc. of water containing 30 grams of sodium carbonate. The resulting solution is cooled to a temperature approximating 0-10° C. by the addition of ice, for example, and the diazonium compound prepared as described above is slowly added with stirring. Upon completion of the coupling reaction which takes place and which is carried out while maintaining a temperature of 0-10° C., the mixture is made acid to litmus by the addition of a mineral acid such as hydrochloric acid and the dye compound formed is recovered by filtration, washed with water and dried. The dye compound obtained colors cellulose acetate silk, wool and silk a greenish yellow shade.

*Example 2*

13.7 grams of p-phenetidine are diazotized in accordance with the method described in Example 1.

14.2 grams of

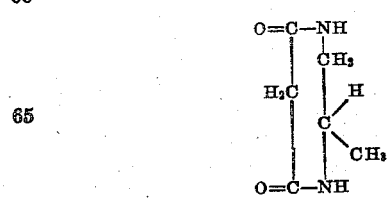

are dissolved in 200 cc. of water containing 10 grams of sodium hydroxide and coupled in accordance with the method described in Example 1 with the diazonium compound prepared as described above. The dye compound obtained colors cellulose acetate silk, wool and silk a greenish-yellow shade.

*Example 3*

15.1 grams of o-propoxyaniline are diazotized in accordance with the method described in Example 1 and the diazonium compound obtained is coupled with 14.2 grams of

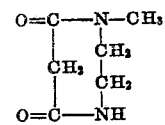

The coupling reaction and recovery of the dye compound may be carried out as described in Example 1. The dye compound obtained colors cellulose acetate silk, wool and silk a greenish yellow shade.

*Example 4*

24.1 grams of 1-amino-2,6-di-β-methoxyethoxybenzene are diazotized in accordance with the method described in Example 1.

17 grams of

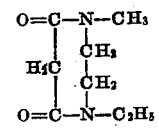

are dissolved in 200 cc. of water containing 10 grams of sodium hydroxide and coupled in accordance with the method described in Example 1 with the diazonium compound prepared as described above. The dye compound obtained colors cellulose acetate silk, wool and silk a greenish yellow shade.

*Example 5*

13.8 grams of o-nitroaniline are diazotized in known manner and the diazonium compound obtained is coupled with 15.6 grams of

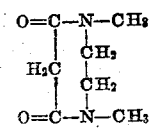

The coupling reaction and recovery of the dye compound may be carried out as described in Example 1. The dye compound obtained colors cellulose acetate silk, wool and silk a greenish yellow shade.

*Example 6*

13.8 grams of p-nitroaniline are diazotized in known fashion and the diazonium compound obtained is coupled with 21.6 grams of

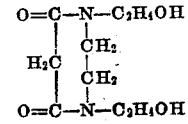

Example 7

13.5 grams of p-aminoacetophenone are diazotized and the diazonium compound obtained is coupled with 18.6 grams of

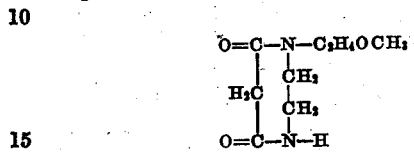

The dye compound obtained colors cellulose acetate silk, wool and silk a greenish yellow shade.

Example 8

17.3 grams of 1-amino-2-nitro-4-chlorobenzene are diazotized in known fashion and coupled with 20.4 grams of

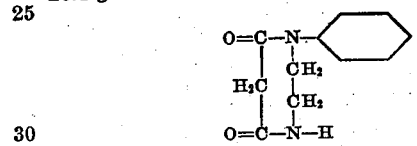

The dye compound obtained colors cellulose acetate, wool and silk a greenish yellow shade.

Example 9

27.2 grams of

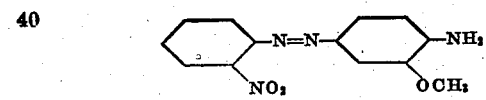

are added to 200 cc. of water to which has been added 40 cc. of 36% hydrochloric acid and the resulting mixture is diazotized at a temperature of 20° C. by the addition, with stirring, of 6.9 grams of sodium nitrite dissolved in water.

20.9 grams of

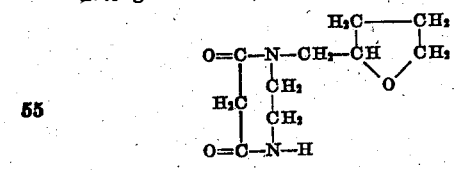

are dissolved in a dilute aqueous sodium carbonate solution and coupled with the diazonium compound prepared above in accordance with the method described in Example 1. The dye compound obtained colors cellulose acetate silk a greenish-yellow shade.

Example 10

18.9 grams of 6-methoxy-2-aminobenzothiazole,

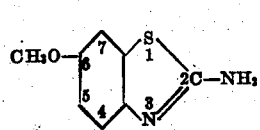

are dissolved in a warm mixture of 60 grams of water, 25 grams of formic acid and 110 grams of concentrated sulfuric acid, (specific gravity 1.84). The resulting solution is then cooled to a temperature of −5° C. and diazotized at this temperature by adding, with stirring, a water solution of 6.9 grams of sodium nitrite.

23.2 grams of

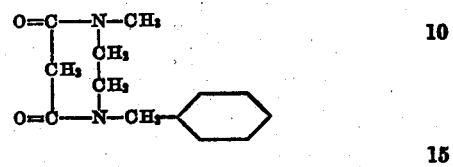

are dissolved in 200 cc. of water containing 10 grams of sodium hydroxide and coupled in accordance with the method described in Example 1 with the diazonium compound prepared above. The dye compound obtained colors cellulose acetate silk, wool and silk a greenish-yellow shade.

Example 11

16 grams of 1-amino-8-naphthol-2,4-disulfonic acid are dissolved in 150 cc. of water containing 11 grams of sodium carbonate. The resulting solution is cooled by the addition of ice and 7 grams of sodium nitrite are added. The solution resulting is then added dropwise to an iced solution of 50 grams of 36% hydrochloric acid in 50 grams of water whereby diazotization of the 1-amino-8-naphthol-2,4-disulfonic acid is effected. 9.3 grams of

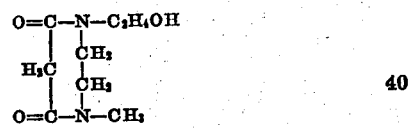

are dissolved in a dilute aqueous sodium hydroxide, the resulting solution is cooled to a temperature approximating 0–10° C. and following this the diazonium compound prepared above is slowly added with stirring. Upon completion of the coupling reaction which takes place, the mixture is made acid to litmus by the addition of hydrochloric acid and the dye compound is salted out by the addition of sodium chloride, recovered by filtration, washed and dried. The dye compound obtained colors wool and silk a yellow shade.

5.4 grams of 2-amino-5-nitrobenzenesulfonic acid or 11.95 grams of 1-amino-2-naphthol-4-sulfonic acid, for example, can be substituted for the 1-amino-8-naphthol-2,4-disulfonic acid of the example and upon diazotization in known fashion can be coupled with the coupling component just mentioned or with any of the other coupling components mentioned herein to obtain dye compounds within the scope of our invention which are of value for the dyeing of wool and silk.

The following tabulation further illustrates the compounds employed in the process of my invention together with the color they produce on cellulose acetate silk. The compounds indicated below may be prepared by diazotizing the amine listed under the heading "Amine" and coupling the diazonium compounds obtained with the compounds specified in the column entitled "Coupling component." The diazotization and coupling reactions may, for example, be carried out following the general procedure described in Examples 1 to 11 inclusive.

| Amine | Coupling component | | Color on cellulose acetate silk |
|---|---|---|---|
| Aniline | (1) | O=C—NH—CH₃—CH₂—OH₂—O=C—NH (structure) | Greenish-yellow. |
| Do | (2) | (structure with O=C—N—CH₃, CH₃, H, CH₃, CH₃, O=C—NH) | Do. |
| Do | (3) | (structure with O=C—N—C₂H₄OH, CH₃, CH₃, O=C—N—CH₂—phenyl) | Do. |
| Do | (4) | (structure with O=C—N—CH₂—HC, H₃C—CH₂, CH₂, O, CH₃, CH₃, O=C—N—phenyl) | Do. |
| p-Anisidine | 1–4 above | | Do. |
| o-Phenetidine | 1–4 above | | Do. |
| o-Phenoxyaniline | 1–4 above | | Do. |
| o-Toluidine | 1–4 above | | Do. |
| o-(Cl, Br, I)-aniline | 1–4 above | | Do. |
| o-β-hydroxyethoxyaniline | 1–4 above | | Do. |
| 1-amino-2,4-dimethoxybenzene | 1–4 above | | Do. |
| 1-amino-2-methoxy-6-ethoxy-benzene | 1–4 above | | Do. |
| 1-amino-2-naphtholmethyl-ether | 1–4 above | | Do. |
| o-Nitroaniline | 1–4 above | | Do. |
| 1-amino-2-nitro-4-chlorobenzene | 1–4 above | | Do. |
| Dianisidine | 1–4 above | | Do. |
| 2-amino-6-methoxybenzothiazole | 1–4 above | | Do. |
| p-Aminophenol | 1–4 above | | Do. |
| o-Aminobenzoic acid ethyl ester | 1–4 above | | Do. |
| o-Aminobenzamide | 1–4 above | | Do. |
| p-Aminodimethylaniline | 1–4 above | | Red. |

The coupling compounds employed in the preparation of the azo dye compounds of our invention can be prepared in accordance with the general methods described in Gerichte der Deutschen Chemischen Gesellschaft, vol. 17, page 137 and vol. 28, page 823 of this same journal. An example of the preparation of one of the coupling compounds is given hereinafter.

Preparation of

23 grams of sodium are dissolved in 400 cc. of absolute ethanol and 160 grams of ethyl malonate are added following which 50 grams of ethylene diamine are also added. The reaction mixture resulting is refluxed with stirring for six hours. Upon completion of the refluxing, most of the ethanol is distilled off and the mixture resulting is made slightly acid to litmus by the addition of acetic or hydrochloric acid. On standing, the desired compound separates out and may be recovered by filtration, washed with water and dried.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. Azo dye compounds having the general formula:

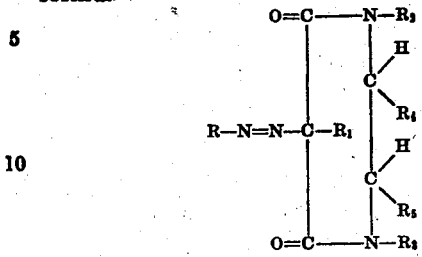

wherein R represents the residue of an aromatic nucleus, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

2. Azo dye compounds having the general formula:

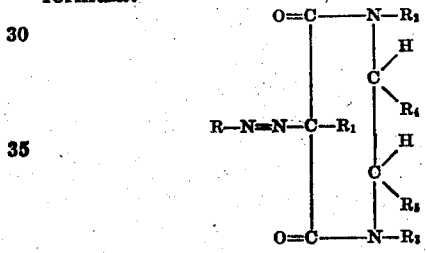

wherein R represents the residue of an aryl nucleus of the benzene series, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

3. Monoazo dye compounds having the general formula:

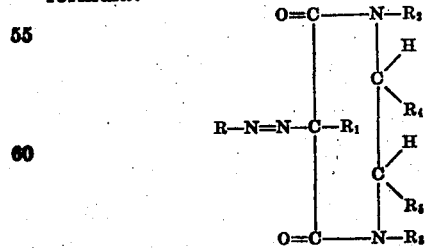

wherein R represents the residue of an aryl nucleus of the benzene series, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

4. Nuclear non-sulfonated monoazo dye compounds having the general formula:

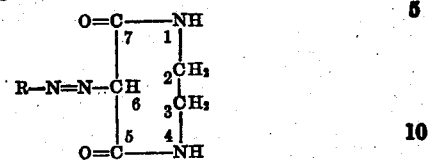

wherein R represents the residue of an aryl nucleus of the benzene series, wherein each of the hydrogen atoms in the 1, 4 and 6 positions of the heterocyclic nucleus may be replaced with an alkyl group and wherein one of the hydrogen atoms in each of the 2 and 3 positions may be replaced with an alkyl group.

5. Monoazo dye compounds having the general formula:

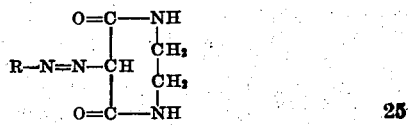

wherein R represents the residue of an aryl nucleus of the benzene series.

6. The process of coloring material made of or containing an organic derivative of cellulose which comprises applying thereto a nuclear non-sulfonated azo dye compound having the general formula:

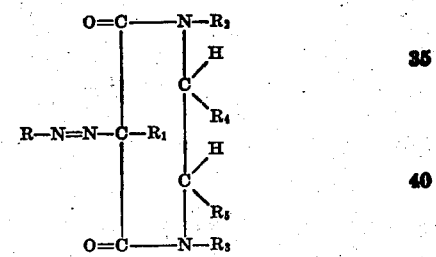

wherein R represents the residue of an aromatic nucleus, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

7. The process of coloring material made of or containing an organic derivative of cellulose which comprises applying thereto a nuclear non-sulfonated monoazo dye compound having the general formula:

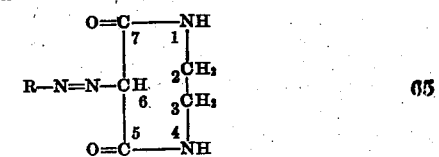

wherein R represents the residue of an aryl nucleus of the benzene series, wherein each of the hydrogen atoms in the 1, 4 and 6 positions of the heterocyclic nucleus may be replaced with an alkyl group and wherein one of the hydrogen atoms in each of the 2 and 3 positions may be replaced with an alkyl group.

8. The process of coloring a cellulose acetate which comprises applying thereto a nuclear nonsulfonated azo dye compound having the general formula:

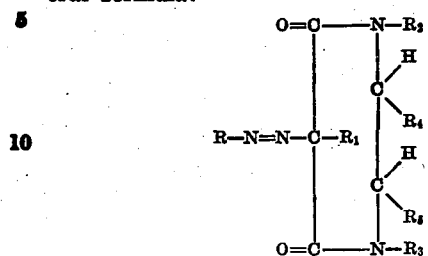

wherein R represents the residue of an aromatic nucleus, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

9. Material made of or containing an organic derivative of cellulose colored with a nuclear nonsulfonated monoazo dye compound having the general formula:

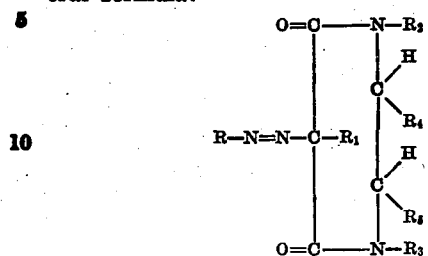

wherein R represents the residue of an aryl nucleus of the benzene series, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

10. A cellulose acetate colored with a nuclear nonsulfonated monoazo dye compound having the general formula:

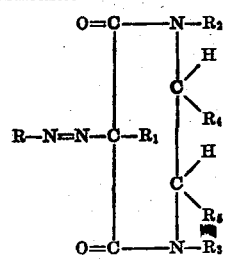

wherein R represents the residue of an aryl nucleus of the benzene series, $R_1$ represents a member selected from the group consisting of hydrogen and an alkyl group, $R_2$ and $R_3$ each represents a member selected from the group consisting of hydrogen, an alkyl group, an aralkyl group, an aryl group and a furyl group attached to the nitrogen atom through the carbon atom in the 2-position by means of a saturated straight chain hydrocarbon radical containing not more than four carbon atoms and $R_4$ and $R_5$ each represents a member selected from the group consisting of hydrogen and an alkyl group.

11. A cellulose acetate colored with a nuclear non-sulfonated monoazo dye compound having the general formula:

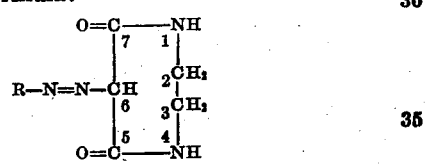

wherein R represents the residue of an aryl nucleus of the benzene series, wherein each of the hydrogen atoms in the 1, 4 and 6 positions of the heterocyclic nucleus may be replaced with an alkyl group and wherein one of the hydrogen atoms in each of the 2 and 3 positions may be replaced with an alkyl group.

12. A cellulose acetate colored with a nuclear non-sulfonated monoazo dye compound having the general formula:

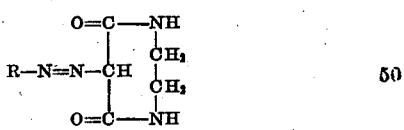

wherein R represents the residue of an aryl nucleus of the benzene series.

JAMES G. McNALLY.
JOSEPH B. DICKEY.